(12) United States Patent
Kalama et al.

(10) Patent No.: US 10,630,829 B1
(45) Date of Patent: Apr. 21, 2020

(54) DEVICE AND TECHNIQUES FOR MOBILE EXPERIENCE

(71) Applicant: Disney Enterprises, Inc., Burbank, CA (US)

(72) Inventors: Asa K. Kalama, Burbank, CA (US); Robert S. Trowbridge, Burbank, CA (US); Scott Watson, Burbank, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 0 days.

(21) Appl. No.: 16/421,040

(22) Filed: May 23, 2019

(51) Int. Cl.
| H04B 5/00 | (2006.01) |
| H04W 4/80 | (2018.01) |
| H04M 1/02 | (2006.01) |
| H04M 1/725 | (2006.01) |

(52) U.S. Cl.
CPC ....... *H04M 1/7253* (2013.01); *H04M 1/0254* (2013.01); *H04M 1/0274* (2013.01); *H04M 2250/04* (2013.01)

(58) Field of Classification Search
CPC ............. H04M 1/7253; H04M 1/0274; H04M 1/0254; H04M 2250/04; H04B 5/0012; H04B 5/0025; H04B 1/3888; H04W 4/80
See application file for complete search history.

(56) References Cited

U.S. PATENT DOCUMENTS

| 2012/0209745 | A1* | 8/2012 | Spencer, II | G06Q 20/327 705/26.41 |
| 2014/0241540 | A1* | 8/2014 | Hodges | H04M 1/6066 381/74 |
| 2015/0270734 | A1* | 9/2015 | Davison | H02J 7/0044 320/103 |
| 2016/0150069 | A1* | 5/2016 | Chen | H04W 4/80 455/420 |
| 2016/0156603 | A1* | 6/2016 | Janik | H04L 63/0492 726/7 |
| 2016/0301785 | A1* | 10/2016 | Espinoza | H04B 1/3888 |
| 2017/0285771 | A1* | 10/2017 | Jung | G06F 3/03545 |
| 2018/0262894 | A1* | 9/2018 | Daoura | H04W 4/02 |
| 2019/0199388 | A1* | 6/2019 | Cunningham | H04B 1/3888 |

* cited by examiner

*Primary Examiner* — Andrew Wendell
(74) *Attorney, Agent, or Firm* — Kilpatrick Townsend & Stockton LLP

(57) ABSTRACT

Embodiments disclosed herein include an accessory for a computing device. The accessory includes one or more physical attributes that can produce a signal that can be detected by one or more sensors of the computing device. Once detected by the one or more sensors of the computing device, the signal can be compared with at least one signature stored in a memory of the computing device. If there is a match between the detected signal and the signature in memory, an application running on the computing device can instruct the a processor of the computing device to execute an action.

19 Claims, 14 Drawing Sheets

DEVICE AND TECHNIQUES FOR MOBILE EXPERIENCE

FIELD

The present disclosure relates generally to accessories for computing devices.

BACKGROUND

Consumers desire accessories to protect their computing devices such as smartphones, or tablets. These accessories can comprise of protective cases, bumpers, stands, or wallet portfolios configured to hold the computing device. Consumers often carry their computer devices with them including to various entertainment venues. Entertainment venues are increasingly becoming more interactive such that venues seek ways to interact with consumers through a their mobile devices. One way consumers can interact with rides, shows, or design features of an entertainment venue is through applications on a computing device. Accessories can be designed to match the theme of the entertainment venue. However, currently available accessories do not have features that cause the computing device to perform certain actions (e.g., unlock features in one or more applications of the computing device.) It would be desirable for features of an accessory to unlock magical features on the computing device.

BRIEF SUMMARY

Certain embodiments are directed to devices and techniques for a mobile experience. In one aspect, an accessory for interacting with a computing device, includes an attachment point for coupling the accessory to the computing device. The accessory can include a triggering device coupled with the accessory. The triggering devices can generate a signal that when detected can cause an action in the computing device.

In some embodiments, the triggering device can include a near field communication tag embedded in the accessory. The near field communication tag can transmits one or more wireless signals to the computing device. The one or more wireless signals can trigger the action in the computing device.

In some embodiments, the triggering device can include a magnet coupled to the accessory, wherein the magnet causes a change in a local magnetic field. The changes in the local magnetic field can be detected by a magnetometer of the computing device, triggering the action in the computing device.

In some embodiments, the triggering device can include an identification code imprinted or affixed to the accessory such that a sensor of the computing device detects the identification code during coupling of the computing device and accessory. The detection of the identification code can trigger the action in the computing device.

In some embodiments, the triggering device can include a capacitive tip nub affixed to the accessory such that one or more capacitive tip nubs touches at least a portion of a touch screen display of the computing device, thereby triggering the action in the computing device.

In some embodiments, the triggering device can include an acoustic resonator affixed to the accessory such that the acoustic resonator emits a target frequency. The target frequency can be received by a microphone of the computing device thereby triggering the action in the computing device.

In some embodiments, the triggering device can include a notch filter affixed to the accessory. The notch filter can be affixed or embedded in a housing of an accessory to overlay the camera of the computing device. The notch filter can block a frequency range, whereby an application running on the computing device can detect an absence of the frequency range blocked by the notch filter thereby triggering the action in the computing device.

In one aspect, a computer-implemented method can be performed by one or more processors, the method including detecting a signal from a triggering device coupled with an accessory. The method can also include comparing the detected signal to a plurality of signatures stored in a memory of a computing device. Finally, the method can include providing instructions to one or more processors to perform an action based at least in part on a match between the detected signal and one of the plurality of signatures stored in the memory.

In various embodiments, the signal can include a radio frequency signal received from a near field communication tag attached to the accessory.

In various embodiments, the signal can include a magnetic signal resulting from a change in magnetic field detected by a magnetometer of the computing device. The change in magnetic field can be caused by a movement of the computing device relative to one or more magnets embedded or affixed to in the accessory.

In various embodiments, the signal can be generated by an image processor by detecting an identification code affixed to the accessory such that a sensor of the computing device detects the identification code during coupling of the computing device and the accessory.

In various embodiments, the signal can include an electrical signal generated by a touch screen display caused by a capacitive tip nub affixed to the accessory such that the capacitive tip nub touches at least a portion of a touch screen display of the computing device.

In various embodiments, the signal can include an acoustic signal generated by an acoustic resonator affixed to the accessory such that the acoustic resonator emits a target frequency received by a microphone of the computing device.

In various embodiments, the signal comprises an electronic signal from a digital camera of the computing device, wherein an image processor of the digital camera detects a frequency range blocked by a notch filter installed over the lens of the digital camera.

In one aspect, a non-transitory, computer-readable medium comprising instructions that, when executed by one or more processors, cause the one or more processors to perform operations. The operations can include detecting a signal from a triggering device coupled with an accessory. The operations can also include comparing the detected signal to a plurality of signatures stored in a memory of a computing device. The operations can include providing instructions to one or more processors to perform an action based at least in part on a match between the detected signal and one of the plurality of signatures stored in the memory.

In various embodiments, the signal can include a radio frequency signal from a near field communication chip attached to the accessory.

In various embodiments, the signal can detect a change in magnetic field detected by a magnetometer of the computing device caused by a movement of a computing device relative to one or more magnets embedded in the accessory.

In various embodiments, the signal can include detection an identification code affixed to the accessory such that a sensor of the computing device detects the identification code during coupling of the computing device and the accessory.

In various embodiments, the signal can include an electrical signal generated by a touch screen display by a capacitive tip nub affixed to the accessory such that the capacitive tip nub touches at least a portion of a touch screen display of the computing device.

In various embodiments, the signal comprises an acoustic signal generated by an acoustic resonator affixed to the accessory such that the acoustic resonator emits a target frequency received by a microphone of the computing device.

A better understanding of the nature and advantages of embodiments of the present disclosure may be gained with reference to the following detailed description and the accompanying drawings.

BRIEF DESCRIPTION OF THE DRAWINGS

A further understanding of the nature and advantages of the present disclosure may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

The included drawings are for illustrative purposes and serve only to provide examples of possible structures and arrangements for the disclosed inventive apparatuses and methods for an immersive content production system. These drawings in no way limit any changes in form and detail that may be made to the disclosure by one skilled in the art without departing from the spirit and scope of the disclosure. The embodiments will be readily understood by the following detailed description in conjunction with the accompanying drawings, wherein like reference numerals designate like structural elements, and in which.

DETAILED DESCRIPTION

Embodiments disclosed herein include an accessory for a computing device. The accessory includes one or more physical attributes that can produce a signal that can be detected by one or more sensors of the computing device. Once detected by the one or more sensors of the computing device, the signal can be compared with at least one signature stored in a memory of the computing device. If there is a match between the detected signal and the signature in memory, an application running on the computing device can instruct the a processor of the computing device to execute an action.

Figure 1:
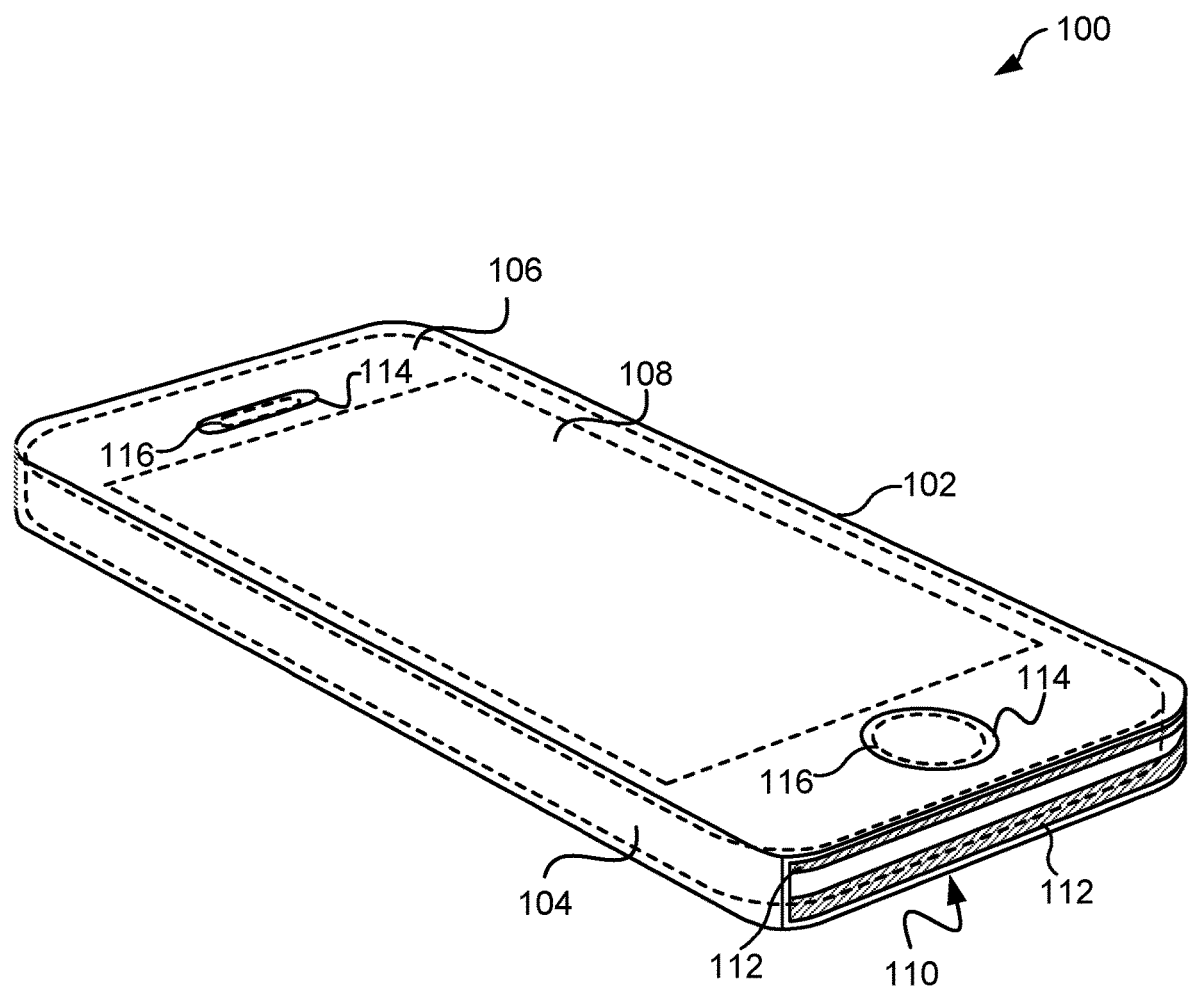
FIG. 1 illustrates an exemplary first perspective of an accessory for a computing device.

FIG. 1 illustrates an exemplary first perspective of an accessory 100 for housing a computing device 104. In some embodiments, the computing device 104 can be a smartphone. Although, computing device 104 depicted in FIG. 1 resembles an iPhone manufactured by Apple Inc., the accessory 100 can be manufactured for a variety of computing devices 104 including but not limited to those manufactured by Apple, Samsung, Huawei, Google, Sony, Nokia, et. al. The accessory 100 can include the housing 102 forming an enclosure to fit the computing device 104. The structure can be manufactured from plastic, silicone gel, leather or synthetic leather, or metal alloys. Polycarbonate and polypropylene are the hardest plastic material used to make housings 102. The housing 102 can also be manufactured by composite fiber materials. Additionally, the housing 102 can be formed by a combination of one or more of the above listed materials.

In some embodiments, the housing 102 can include a front side 106 and a rear side (not displayed in FIG. 1). The front side 106 can be associated with a display 108 of the computing device 104. The front side 106 can include an opening in the housing 102 over the display 108. In some embodiments, the front side 106 can be coupled with a clear plastic, synthetic glass (e.g., gorilla glass) cover over the display 108. The housing 102 can include a recess 110 including flexible lips 112 forming an attachment point for securing the computing device 104 in the housing 102. The computing device 104 can be inserted between the flexible lips 112. The flexible lips 112 can retain the computing device 104 in the housing 102. The housing 102 can include one or additional recesses 114 for additional features 116 of the computing device 104. In some embodiments, the housing is a slim case in which the inside edges of the case conform with the exterior edges of the computing device resulting in an attachment point. In some embodiments, the housing can be a folio case similar to a wallet with an interior plastic shell that conforms with the exterior edges of the computing device. In some embodiments, the housing comprises a plurality of arms configured to conform around the corner edges of the computing device.

Figure 2:
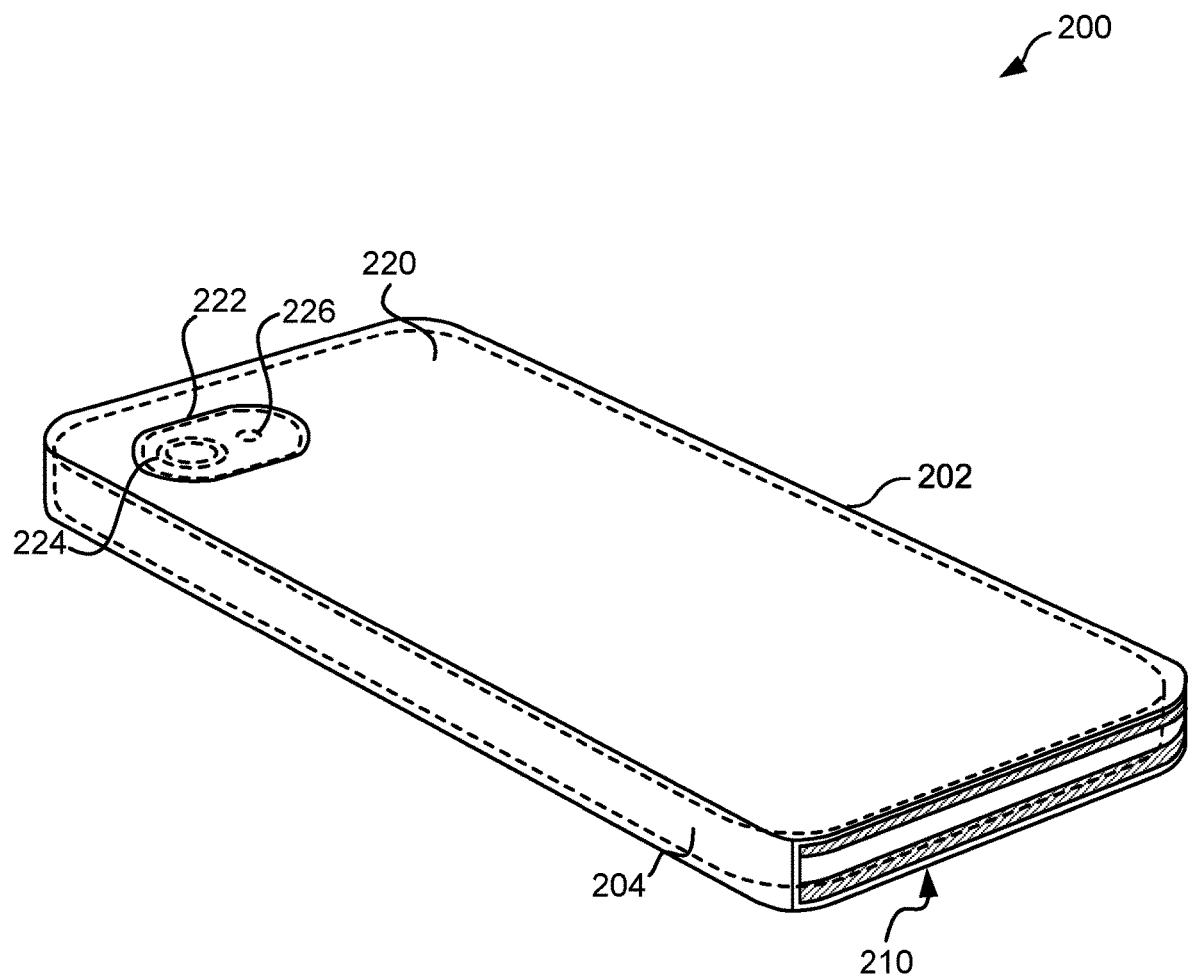
FIG. 2 illustrates an exemplary second perspective of an accessory for a computing device.

FIG. 2 illustrates an exemplary second perspective of an accessory 200 for a computing device 204. The housing 202 can include a recess 210 for inserting a computing device 204. In some embodiments, the housing 202 can include a front side and back side 220. The back side 220 of the housing 202 can include one or more openings including but not limited to an camera opening 222. FIG. 2 illustrates an exemplary rear camera 224 and rear flash 226 for the computing device 204.

Figure 3:
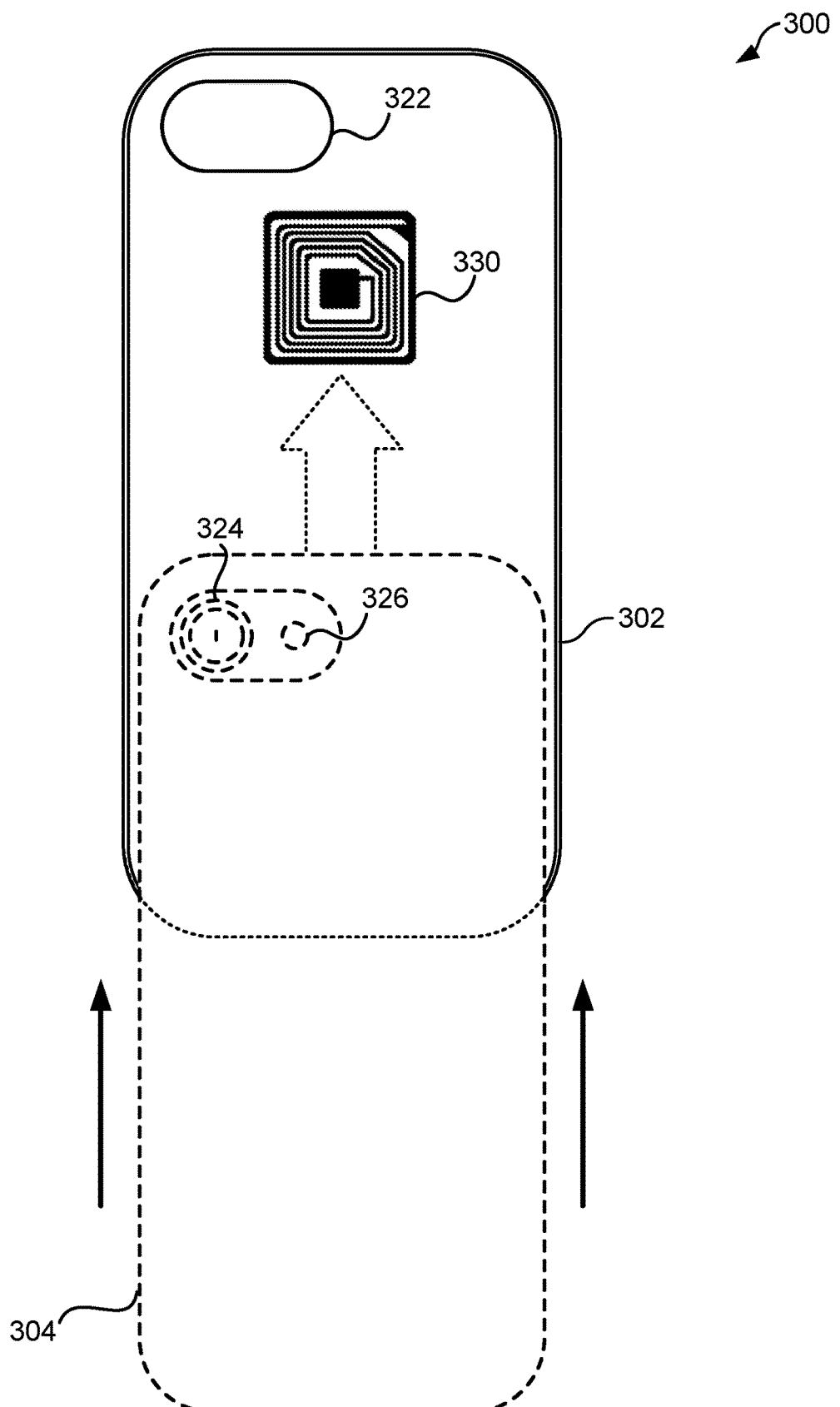
FIG. 3 illustrates an accessory with a near field communication tag.

FIG. 3 illustrates an accessory 300 including a housing 302 including an embedded near field communication (NFC) tag 330. FIG. 3 illustrates a computing device 304 being slid into a housing 302. The computing device can have a camera 324 and a flash 326. The housing 302 can include an opening 322 in the housing 302. The NFC tag 330 can be embedded in the front side 106, shown in FIG. 1, or back side 220, shown in FIG. 2, of the housing 302.

The near field communication tag 330 uses a set of communication protocols that enable two electronic devices, one of which is usually a portable device such as a smartphone, to establish communication by bringing them approximately within 4 cm (1.6 in) of each other. NFC is a set of short-range wireless technologies, typically requiring a separation of 10 cm or less. NFC operates at 13.56 MHz on ISO/IEC 18000-3 air interface and at rates ranging from 106 kilobit per second to 424 kilobit per second. NFC involves an initiator and a target; the initiator actively generates a radio frequency (RF) field that can power a passive target. This enables NFC targets to take very simple form factors such as unpowered tags, stickers, key fobs, or cards. NFC tags 330 contain data and are typically read-only, but may be writeable. The NFC tags 330 can be custom-encoded by their manufacturers or use NFC Forum specifications. The tags 330 can securely store personal data such as debit and credit card information, loyalty program data, PINs and networking contacts, among other information. The NFC Forum defines four types of tags that provide different communication speeds and capabilities in terms of configurability, memory, security, data retention and write endurance. NFC Tags 330 currently offer between 96 and 4,096 bytes of memory.

Computing devices 204 can include NFC readers. Some computing devices 204 (e.g., iPhone 6 and 6 Plus) have NFC capabilities, but only for payments. Some computing devices 204 (e.g., iPhones 7, 8 and X) have NFC for payments but additionally, with iOS 11 and an NFC App, they can read NFC tags. The latest iPhone XS, XS Max and XR have NFC for payments and can read NFC tags with or without an additional App. At present, no iPhone can write to an NFC tag. Many Android compatible phones include NFC reader capabilities. Android phones can also have increased capabilities to write to NFC and peer-to-peer (P2P) NFC capabilities. Peer-to-Peer (P2P) allows for file sharing between two powered, NFC-enabled devices. This mode is known in Android devices as Android Beam. Android phones have Android Beam, a feature that allows two smartphones to quickly share a web page, contact, photo, video, or other type of information. Touch two phones back-to-back and the content being viewed on one device will be sent to the other. File transfers are handled via Bluetooth once they're initiated, but there's no complex Bluetooth pairing process just tap and the rest will happen automatically.

NFC tags 330 are unpowered NFC chips that draw power from a nearby computing device 304 (e.g., smartphone or other powered NFC device.) The NFC tag 330 can be embedded in the material of the housing 302. The NFC tags 330 can be heat resistant for short periods of time to be placed in the mold prior to injection of molten plastic. In some embodiments, the tag can be covered with a heat resistant material prior to incorporation in the mold.

A NFC Tag 330 itself can consists of three basic components: an NFC chip, an antenna and something to keep it together. The NFC chip is a tiny microchip which contains a small amount of memory and the technology to allow it to communicate. The antenna can be a coil or loop of wire which in the case of a sticker will be an etching a fraction of a millimeter thick. The substrate holds it together and would typically be a thin sheet of plastic. If the NFC tag 330 is a sticker, it will have adhesive on one side to allow it to be attached.

Adding data to an NFC tag 330 is called encoding. A wide variety of data types can be encoded onto an NFC tag 330. The encoded information can include: a URL (web address), a telephone number or simply a small ID number. The data can be stored in a particular way called NFC data exchange format (NDEF) encoding. This universal way of storing NFC information means that almost any NFC enabled device will be able to read and understand the data and what type of data it is. The amount of memory encoded on an NFC tag 330 depends on the type of tag used. Most NFC tags 330 can store only a limited amount of memory (i.e., NTAG213 chip NFC tag can store a URL up to around 130 characters). Text or numbers can be stored on an NFC tag 330. The NFC tag 330 can be encoded prior to or subsequent to being embedded in or on the housing 302. The NFC tag 330 can be encoded with code which can include text or characters. The NFC tag 330 can be read by the NFC reader of the computing device 330. The computing device 330 can validate the code and unlock certain features of the computing device. For example, detection of a valid code can result in the resetting the background of the computing device. The NFC tag 330 can also be read by a NFC reader on a wearable device (e.g., iWatch). The code on the NFC tag 330 can unlock features on the wearable device.

In some embodiments, the computing device 304 can detect the NFC tag 330 when the computing device 304 is slid into the housing 302. In some embodiments, an application can include one or more instructions causing one or more processors on the computing device 304 to instruct an NFC reader to read the NFC tag 330. The NFC reader on the computing device can read a code on the NFC tag 330. The application can validate the code to determine if the case is an authorized accessory. In some embodiments, the computing device 304 can access a network (e.g., the internet) to download one or more access codes to validate the code. In some embodiments, the computing device 304 can compare the code to a list of authorized codes available on-line. In some embodiments, the NFC reader on the computing device 304 when within range of the NFC signal. In some embodiments, an application running on the computing device 304 can send instructions to the NFC reader to read the NFC tag 330. In some embodiments, the computing device 304 can store the code read from the NFC tag 330 in a memory.

Figure 4:
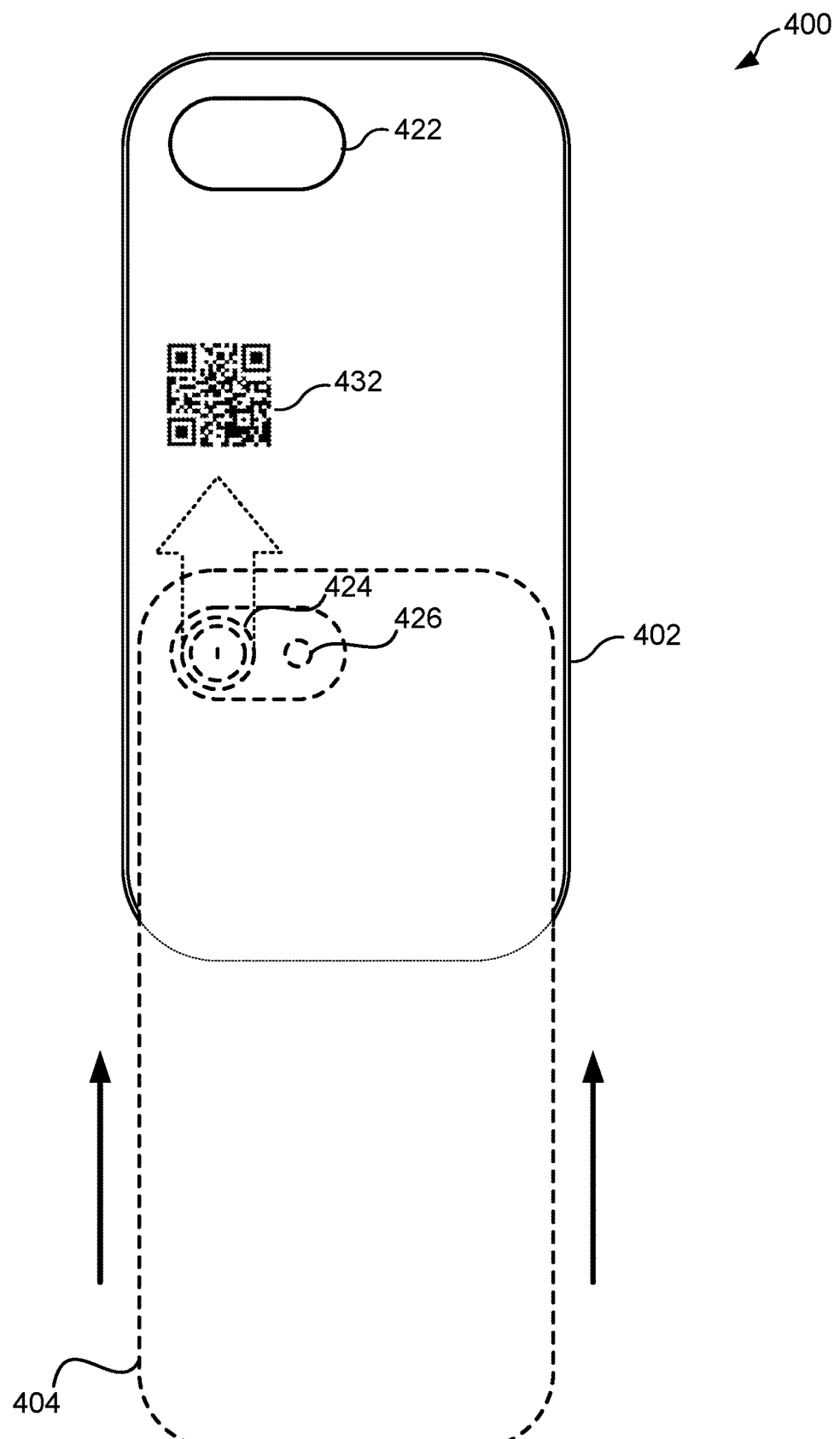
FIG. 4. illustrates an accessory with an quick response (QR) code imprinted on the accessory.

FIG. 4. illustrates an accessory 400 with an quick response (QR) code 432 imprinted on a housing 402. The computing device 404 can include a camera 424 and a flash 426. The housing 402 can include an opening 422 in the housing 402. The location of the QR code 432 can depend on the physical location of the camera 424 and/or flash 426 on the housing 402. FIG. 4 illustrates a computing device 404 being slid into a housing 402. In some embodiments the QR code 432 can be read by the camera 424 prior to coupling the computing device 404 with the housing 402. In some embodiments, the QR code 432 can be imaged as the computing device 404 is slid into the housing 402. In some embodiments, an application on the computing device 404 will need to be running in the foreground of the operating system to engage the camera 424 to read the QR code 432 as the computing device 404 is slid into the housing 402.

In some embodiments, there is a gap between the face of the camera 424 and the material of the housing 402 that is sufficient to allow the camera 424 to focus on the code. In some embodiments, the camera can include a macro lens to allow capturing detailed images at very close distances. In some embodiments the material of the housing 402 over which the QR code 432 is affixed can be translucent. The translucent, transparent, or semitransparent nature of the material of a portion of the housing 402 allows light to enter the housing allowing capture of the image of the QR code 432. Computing devices 404 (e.g., modern smartphones) include programming routines to allow a camera 424 to read a QR code 432.

The QR code 432 can include a code associated with an application. The application running on the computing device 404 can validate the code to determine if the accessory 400 is an authorized accessory. In some embodiments, the computing device 404 can access a network (e.g., the internet) to download one or more access codes to validate the code. In some embodiments, the computing device 404 can compare the code to a list of authorized codes available on-line. In some embodiments, an application running on the computing device 404 can send instructions to the camera 424 to read the QR code 432. In some embodiments, the computing device 404 can store the code read from the QR code 432 in a memory.

Figure 5:
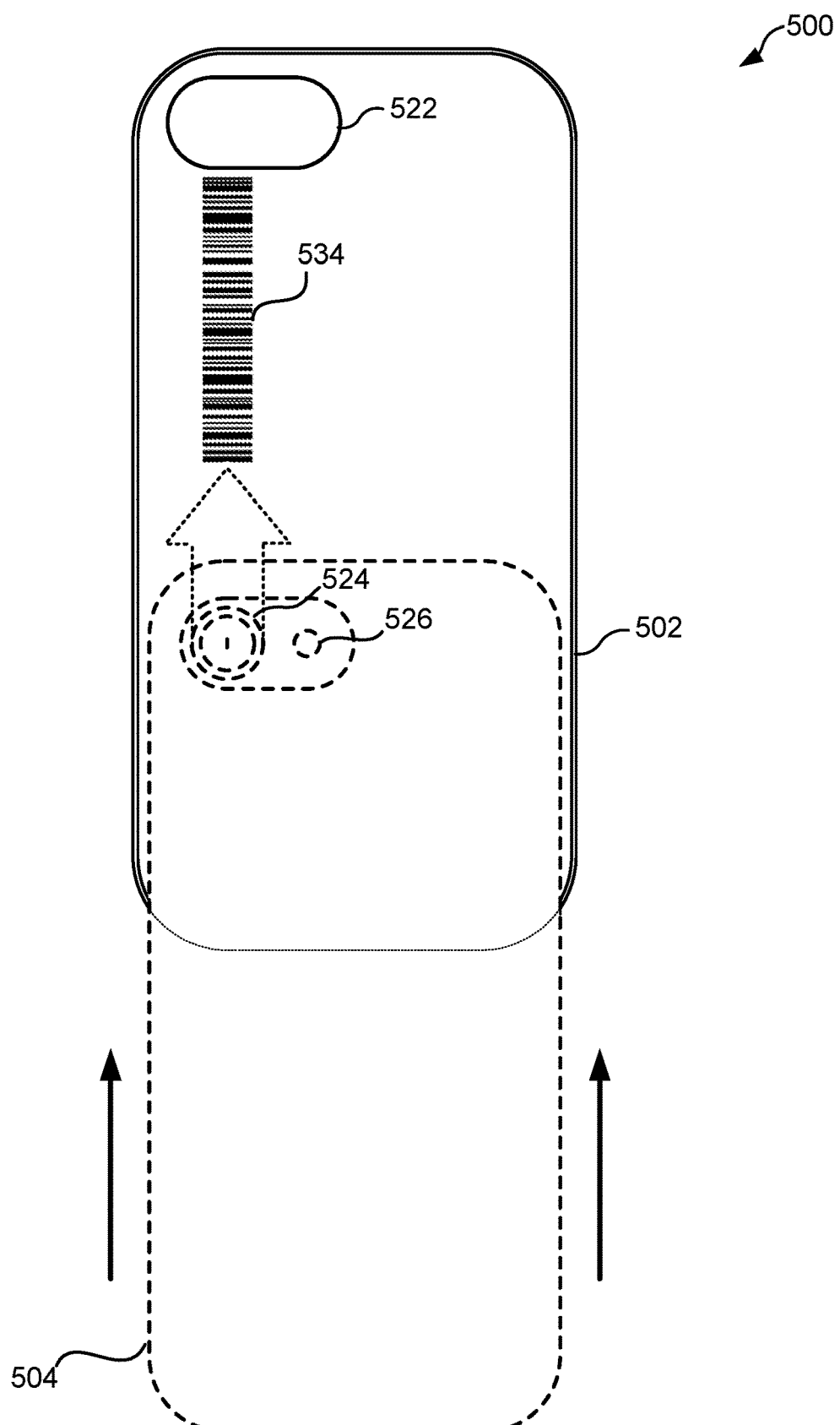
FIG. 5 illustrates an accessory with a bar code imprinted on the accessory.

FIG. 5. illustrates an accessory 500 with an bar code 534 embedded on a housing 502. FIG. 5 illustrates an accessory 500 including a housing 502 including a bar code 534 imprinted on a housing 502. In some embodiments, the bar code 534 can comprise a vertical bar code. The computing device 504 can include a camera 524 and a flash 526. The housing 502 can include an opening 522 in the housing 502. The location of the bar code 534 can depend on the physical location of the camera 524 and/or flash 526 on the housing 502. FIG. 5 illustrates a computing device 504 being slid into a housing 502. In some embodiments the bar code 534 can be read by the camera 524 prior to coupling the computing device 504 with the housing 502. In some embodiments, the bar code 534 can be imaged as the computing device 504 is slid into the housing 502. In some embodiments, an application on the computing device 504 will need to be running in the foreground of the operating system to engage the camera 524 to read the bar code 534 as the computing device 504 is slid into the housing 502.

In some embodiments, there is a gap between the face of the camera 524 and the material of the housing 502 that is sufficient to allow the camera 524 to focus on the code. In some embodiments, the camera 524 can include a macro lens to allow capturing detailed images at very close distances. In some embodiments the material of the housing over which the bar code 534 is affixed can be translucent. The translucent, transparent, or semitransparent nature of the material of a portion of the housing 502 allows light to enter the housing allowing capture of the image of the bar code 534. Computing devices 504 (e.g., modern smartphones) include programming routines to allow a camera 524 to read a bar code 534.

The bar code 534 can include a code associated with an application. The application running on the computing device can validate the code to determine if the accessory 500 is an authorized accessory. In some embodiments, the computing device 504 can access a network (e.g., the internet) to download one or more access codes to validate the code. In some embodiments, the computing device 504 can compare the code to a list of authorized codes available on-line. In some embodiments, an application running on the computing device 504 can send instructions to the camera 524 to read the bar code 534. In some embodiments, the computing device 504 can store the code read from the bar code 534 in a memory.

Figure 6:
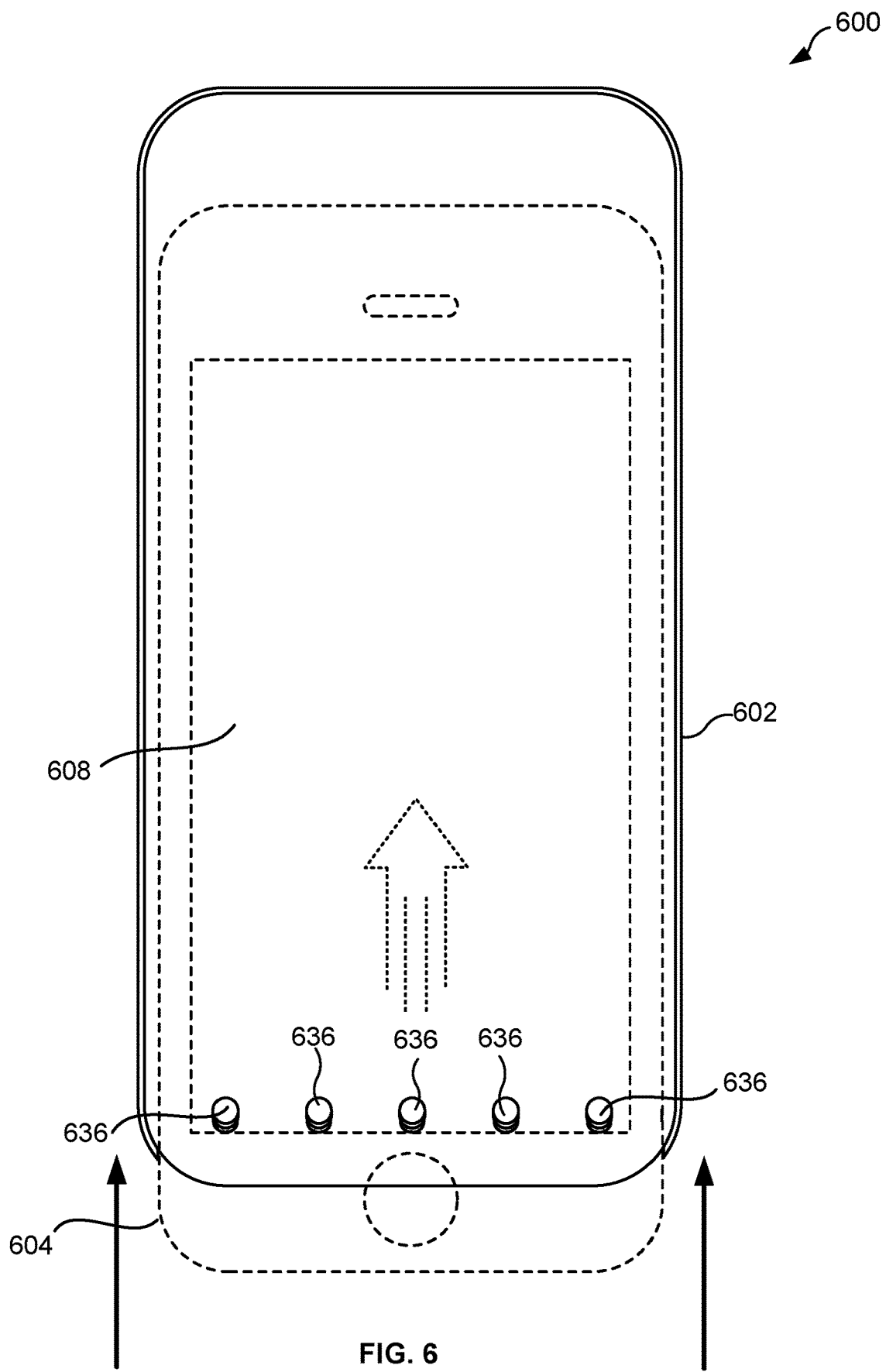
FIG. 6 illustrates a first exemplary perspective of an accessory with one or more capacitance nubs coupled with the accessory.

FIG. 6 illustrates an accessory 600 with one or more capacitive nubs 636 coupled with the housing 602. In some embodiments, one or more capacitive nubs 636 can be coupled with the housing 602 such that the capacitive nubs 636 are affixed to an interior of the housing 602 such that the one or more capacitive nubs 636 can physically contact the touch screen display 608 the computing device 604 as the computing device 604 is slid into the housing 602.

In capacitance sensing, only one side of the insulator is coated with conductive material. A small voltage is applied to this layer, resulting in a uniform electrostatic field. When a conductor, such as a human finger or a capacitive nub, touches the uncoated surface, a capacitor is dynamically formed. Because of the sheet resistance of the surface, each corner can be measured to have a different effective capacitance. The sensor's controller can determine the location of the touch indirectly from the change in the capacitance as measured from the four corners of the panel: the larger the change in capacitance, the closer the touch is to that corner. A touch screen display 608 can employ projected capacitive touch (PCT) technology. PCT technology is a capacitive technology that is accomplished by etching the conductive layer of the display 608. An X-Y grid can be formed either by etching one layer to form a grid pattern of electrodes, or by etching two separate, parallel layers of conductive material with perpendicular lines or tracks to form the grid; comparable to the pixel grid found in many liquid crystal displays (LCD). The greater resolution of PCT allows operation with no direct contact, such that the conducting layers can be coated with further protective insulating layers, and operate even under screen protectors, or behind weather and vandal-proof glass. Because the top layer of a PCT can be manufactured with glass, PCT is a more robust solution versus resistive touch technology.

In some embodiments, the capacitive nub 636 can be manufactured using a conductive silicone rubber. When the capacitive numb 636 touches the display 608 it alters the electrical properties of the charged screen in that spot, registering the touch. The capacitive nub 636 can be made of conductive material to transmit the electrical field necessary to register the contact. In some embodiments, a single capacitive nub 636 may register on the display 608 as the computing device 604 is pushed into the housing 602. In some embodiments, a plurality of capacitive nubs 636 drag across the display 608 forming a distinct pattern. In some embodiments, an application is running in the foreground of the computing device 604 as the computing device 604 is inserted into the housing 602. The display 608 can detect the pattern formed by the one or more capacitive nubs 636 dragging across the display 608. In some embodiments, the capacitive nubs 636 do not make contact with the display 608 after the computing device 604 is completely inserted into the housing 602. In some embodiments, the capacitive nubs 636 continue to make contact with the display 608 after the computing device 604 is completely inserted into the housing 602. In some embodiments, the capacitance nubs 636 form buttons on the exterior of the housing 602 that make contact with the display 608 when depressed.

The application running on the computing device 604 can detect the pattern formed by the capacitive nubs 636 touching the display 608. The application can decode the pattern into a code. The application running on the computing device can validate the code to determine if the accessory 600 is an authorized. In some embodiments, the computing device 604 can access a network (e.g., the internet) to download one or more access codes to validate the code. In some embodiments, the computing device 604 can compare the code to a list of authorized codes available on-line. In some embodiments, the computing device 604 can store the code read from the display 608. If the code is authorized, one or more actions can be executed by the computing device 604 (e.g., unlocking one or more features of an application).

Figure 7:
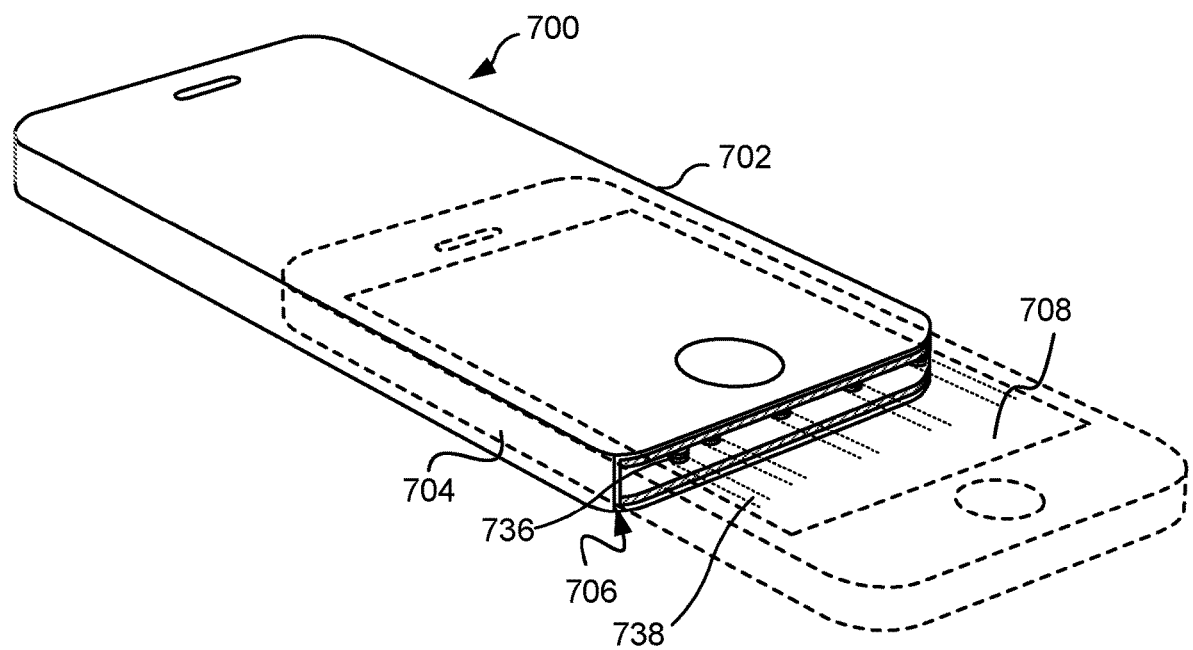
FIG. 7 illustrates a second exemplary perspective of an accessory with one or more capacitance nubs coupled with the accessory.

FIG. 7 illustrates a front perspective view of an accessory 700 including a plurality of capacitive nubs 736. FIG. 7 illustrates the recess 706 in the housing 702 for insertion of the computing device 704. FIG. 7 illustrates one or more capacitive nubs 736 extending from the housing 702 making contact with the display 708 as the computing device 704 is inserted into the housing 702. FIG. 7 illustrates the track 738 of the one or more capacitive nubs 736 across the screen. An application running on the computing device 704 can detect a pattern of the one or more tracks 738. The application can convert the pattern into a code that can, if validated, cause the one or more processors to perform an action.

In some embodiments, the capacitive nubs 736 can be formed on a removable card that can be inserted into a gap of the housing 702 of the accessory. The capacitive nubs 736 on a removable card can make contact with a display 708 of the computing device 704. The gap in the housing can be the recess 110 (shown in FIG. 1). In alternate embodiments, one or more gaps can be formed in the housing 702. In some embodiments, the capacitive nubs can be read via vertical movement (over the longer length of the display 708) or horizontal movement (across the shorter length of the display 708).

Figure 8:
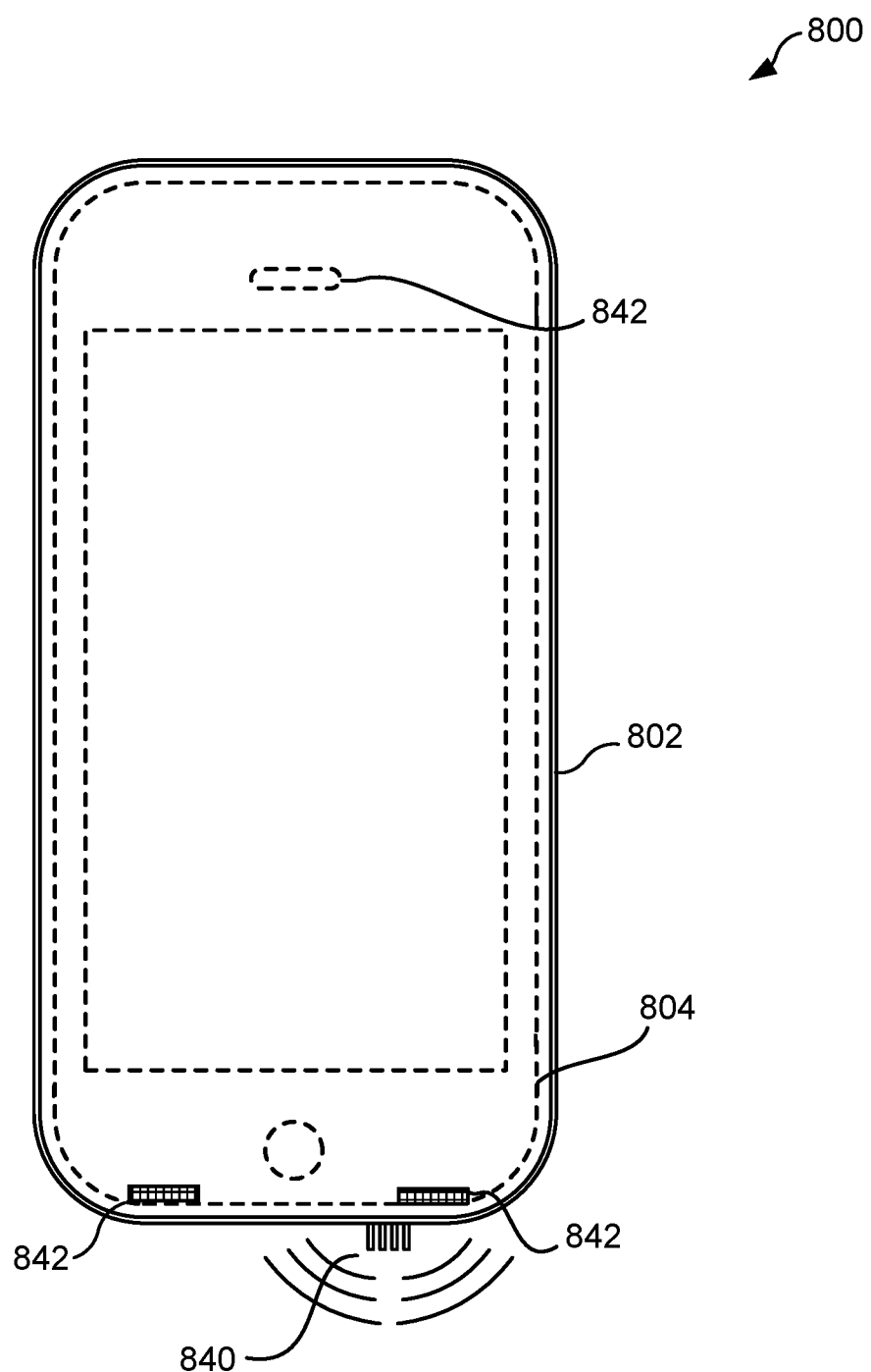
FIG. 8 shows a first exemplary illustration of an accessory with an acoustic resonator coupled with the accessory.

FIG. 8 illustrates an accessory 800 with an acoustic resonator 840 coupled with the housing 802. A housing 802 can encase a computing device 804 comprising one or more microphones 842. In some embodiments, the acoustic resonator can be formed on the housing 802 in the vicinity of the one or more microphones 842. An acoustic resonator 840 can be a device or system that exhibits resonance or resonant behavior, that is, it naturally oscillates at some frequencies, called its resonant frequencies, with greater amplitude than at others. The acoustic resonator 840 can include several fixed projections that extend from the housing 802. The sound produced by the acoustic resonator can be a self-clocking signal allowing for the fixed projections of the acoustic resonator 840 to be activated at different speeds (e.g., the same frequency can be generated whether the speed is fast or slow.) When the fixed projections of the acoustic resonator 840 are strummed the acoustic resonator 840 can vibrate at a distinct frequency. In some embodiments, the one or more microphones 842 of the computing device 804 can receive the frequency and record the sound to a memory. The computing device 804 can analyze the frequency of the recorded sound. If the frequency matches one or more frequencies stored in a memory, the processor of the computing device 804 can authorize the accessory 800. In some embodiments, the processor of the computing device 804 can execute more actions (e.g., unlocking one or more features of an application) if the accessory 800 is authorized.

In some embodiments, a housing 802 can include an a sound module for example, a battery operated device of the types commercially available which include circuitry including an audio signal generating integrated circuit chip, a digital memory storage device for storing pre-loaded digital audio data, a sound producing device in the form of a speaker, a battery power source, and a switch for opening and closing electrical contact with the battery connection to the circuitry. The sound module can contains a circuit board, a battery source, digital memory storage device, switch, and speaker or sound generating device. A user of the computing device can activate the sound module which can result in a distinct song being played. The one or more microphones on the computing device 904 can recognize the song thereby authorizing the accessory 900.

Figure 9:
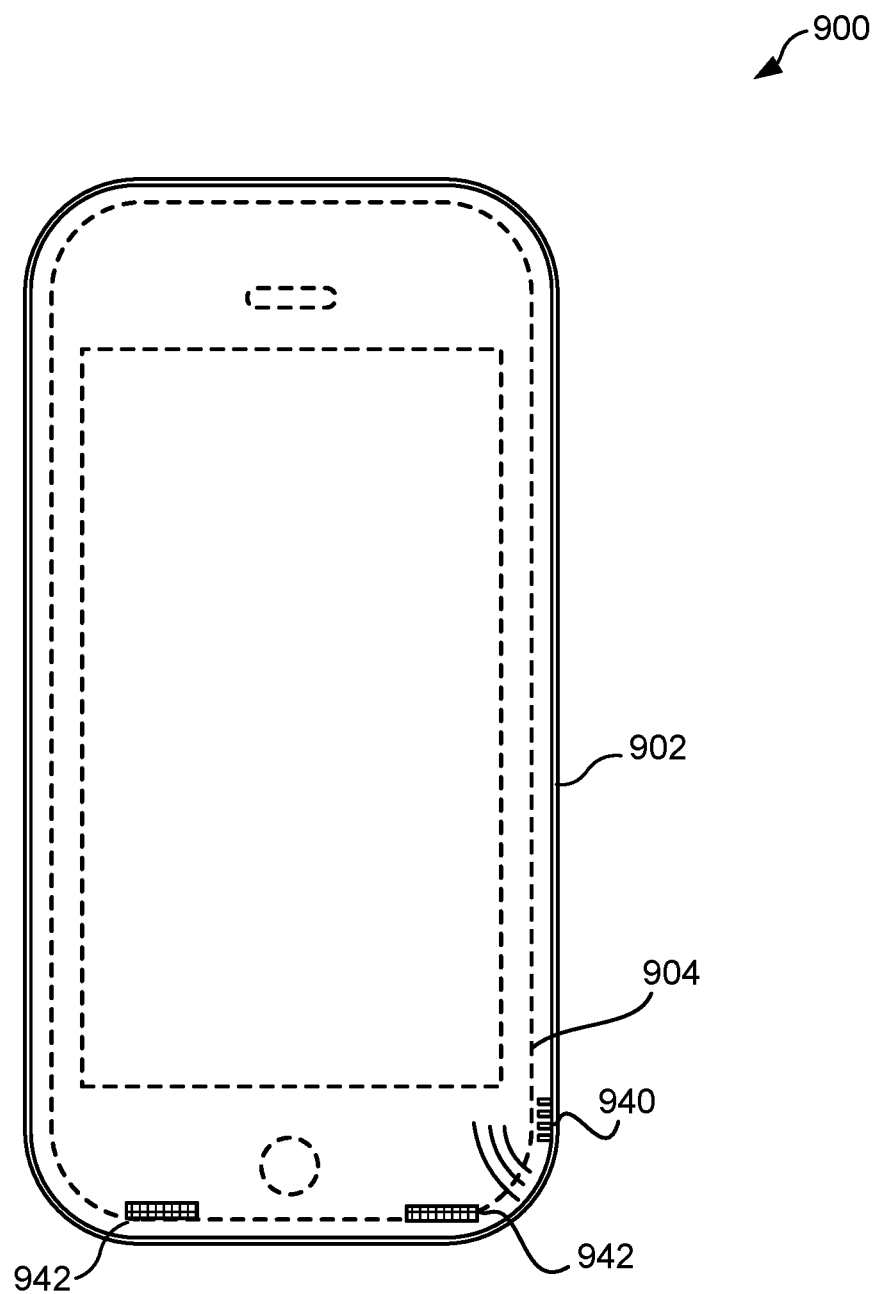
FIG. 9 shows a second exemplary illustration of an accessory with an acoustic resonator coupled with the accessory.

FIG. 9 illustrates an accessory 900 with an acoustic resonator 940 coupled with the housing 902. The coupling in FIG. 9 differs from the coupling depicted in FIG. 8 because the acoustic resonator 940 is formed inside the housing 902. In some embodiments, the acoustic resonator can be ridges formed on the inside of the housing. In some embodiments, inserting the computing device 904 into the housing 902 can cause the computing device 904 to brush against the acoustic resonator 940 cause it to vibrate at a distinct frequency. The fixed projections of the acoustic resonator 940 can vibrate at a distinct frequency. In some embodiments, the one or more microphones 942 of the computing device 904 can receive the frequency and record the sound to a memory. The computing device 904 can analyze the frequency of the recorded sound. If the frequency matches one or more frequencies stored in a memory, the processor of the computing device 904 can authorize the accessory 900. In some embodiments, the processor of the computing device 904 can execute more actions (e.g., unlocking one or more features of an application) if the accessory 900 is authorized. In some embodiments, the application would run in the foreground when the computing device 904 is inserted into the housing 902.

Figure 10:
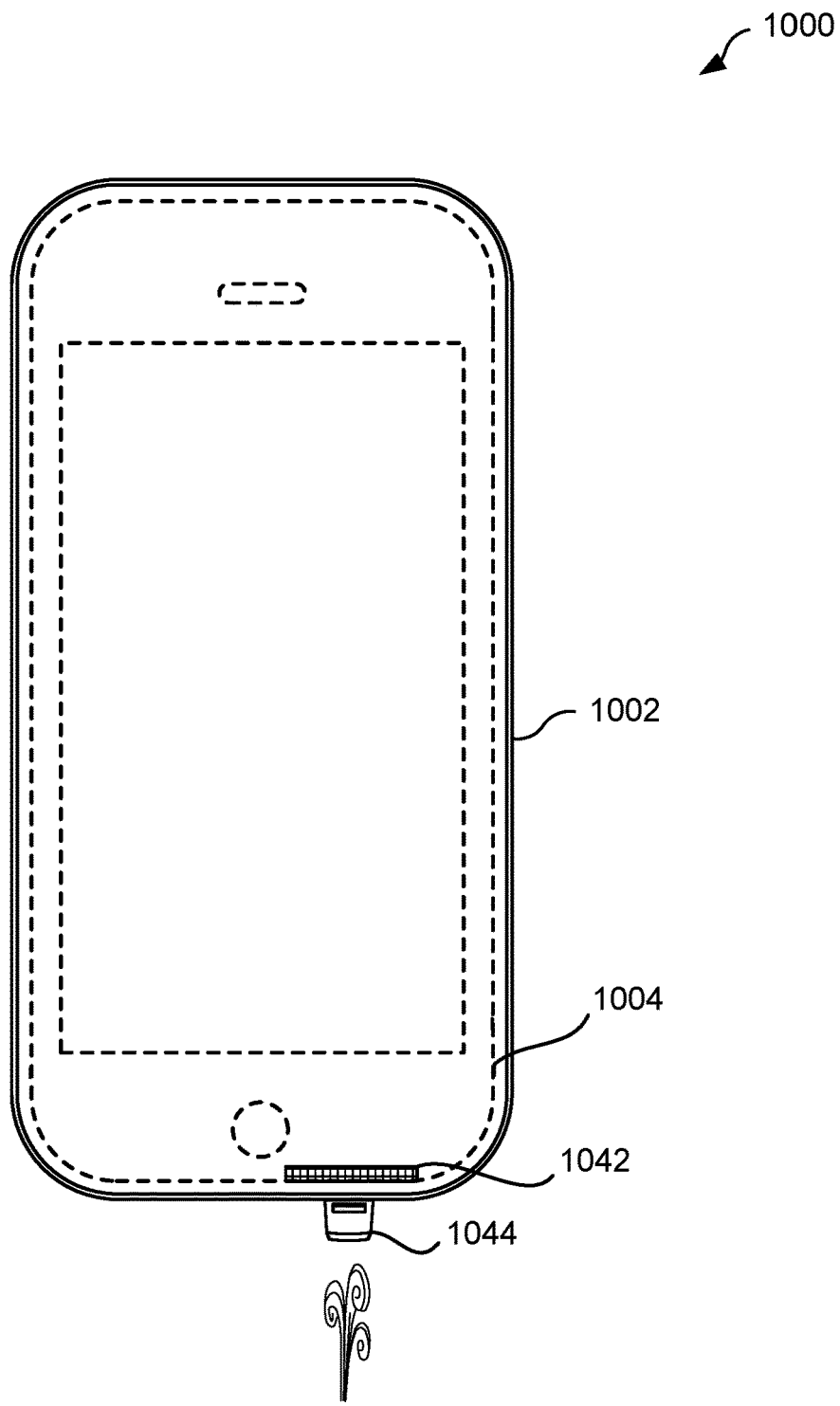
FIG. 10 illustrates an accessory with a whistle coupled with the accessory.

FIG. 10 illustrates an accessory 1000 with an whistle 1044 coupled with the housing 1002. A housing 1002 can encase a computing device 1004 comprising one or more microphones 1042. In some embodiments, the whistle 1044 can be formed on the housing 1002 in the vicinity of the one or more microphones 1042. An whistle 1044 can produce a distinct frequency when blown. In some embodiments, the one or more microphones 1042 of the computing device 1004 can receive the distinct frequency and record the sound to a memory. The computing device 1004 can analyze the distinct frequency of the recorded sound. If the distinct frequency matches one or more frequencies stored in a memory, the processor of the computing device 1004 can authorize the accessory 1000. In some embodiments, the processor of the computing device 1004 can execute more actions (e.g., unlocking one or more features of an application) if the accessory 1000 is authorized.

Figure 11:
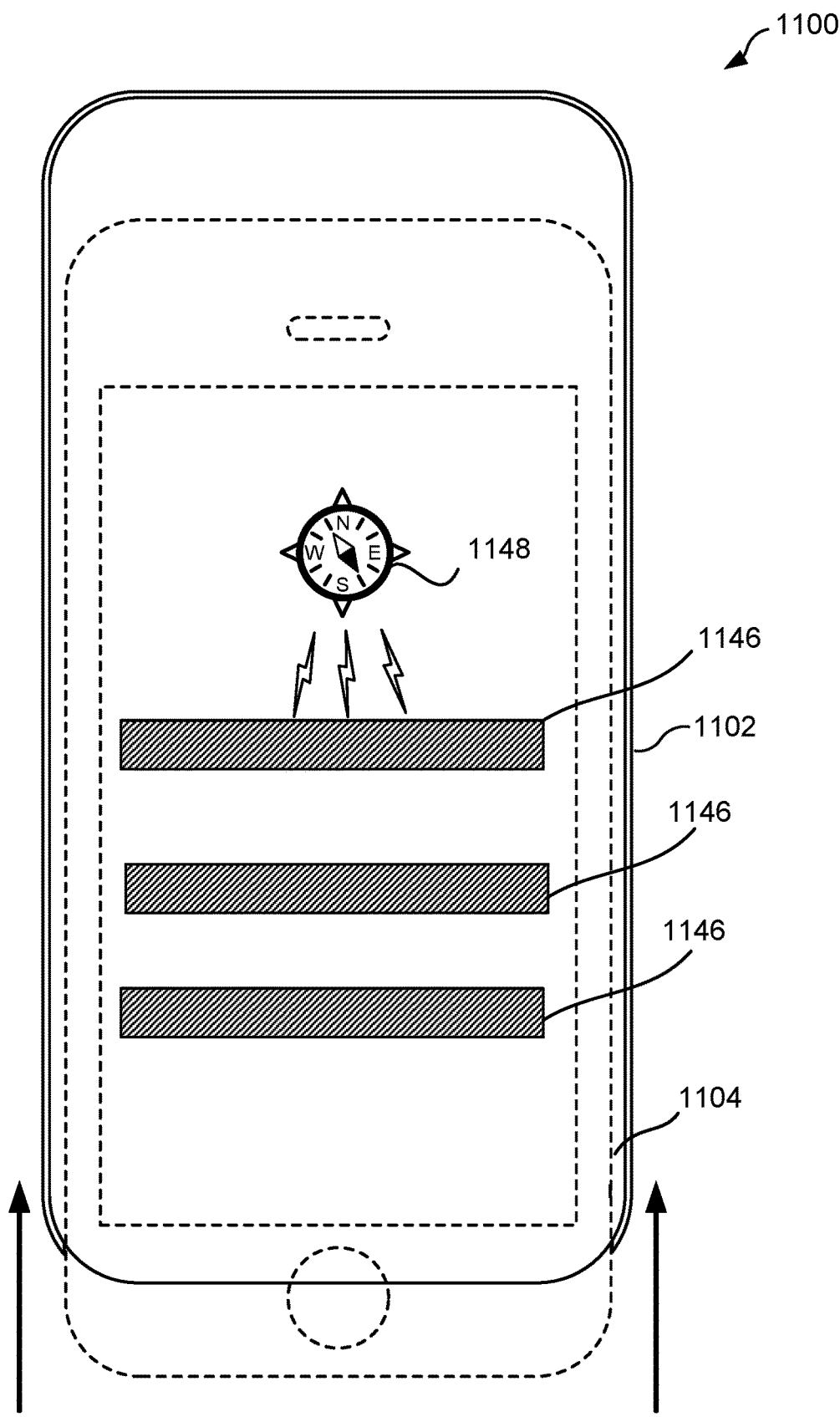
FIG. 11 illustrates an accessory with a plurality of magnets coupled to the accessory.

FIG. 11 illustrates an accessory 1100 with one or more magnets 1146 coupled to the housing 1102. Compass functionality in computing devices 1104 (e.g., smartphones and tablets) can be enabled by a sensor called a magnetometer 1148, which is used to measure the strength and direction of magnetic fields. By analyzing Earth's magnetic field, the magnetometer 1148 allows a computing device 1104 to determine its orientation pretty accurately. The magnetometer 1148 can detect one or more magnets 1146 embedded in or affixed to the housing 1102. The magnetometer 1148 can detect the magnetic field of the one or more magnets 1146 and produce an electrical signal. The electrical signal can be a distinct signal that can be compared with a signature stored in a memory. If the electrical signal matches one or more signatures stored in a memory, the processor of the computing device 1104 can authorize the accessory 1100. In some embodiments, the processor of the computing device 1104 can execute more actions (e.g., unlocking one or more features of an application) if the accessory 1100 is authorized.

Figure 12:
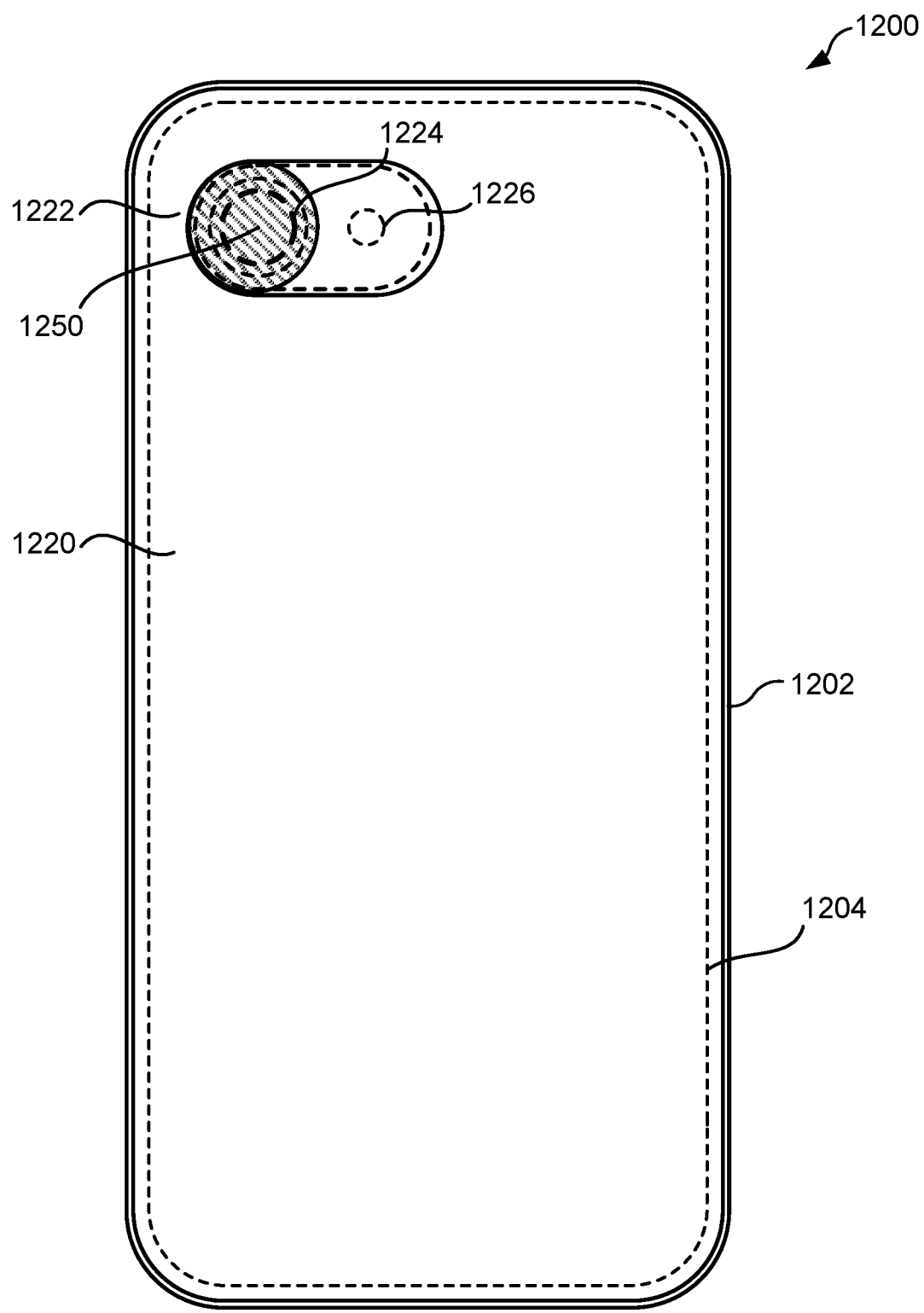
FIG. 12 illustrates an accessory with a filter installed over the camera.

FIG. 12 illustrates an accessory 1200 with a filter 1250 installed over a lens of the camera. FIG. 12 illustrates an exemplary second perspective of an accessory 1200 for a computing device 1204. In some embodiments, the housing 1202 can include a back side 1220. The back side 1220 can include one or more openings including but not limited to an camera opening 1222. FIG. 12 illustrates an exemplary rear camera 1224 and rear flash 1226 for the computing device 204. In some embodiments, the filter 1250 can be a notch filter. A notch filter is a type of band-stop filter that passes most frequencies unaltered, but attenuates those in a specific range to very low levels. A notch filter is a band-stop filter with a narrow stopband. The filter 1250 can be affixed to the housing 1202. The filter 1250 can filter out a known wavelengths of light (e.g., 550 nanometers or red-green-blue (RGB) prime). The camera 1224 can capture digital images which can be analyzed by an image processor in the computing device 1204. The image processor can detect a missing wavelength of light in the digital image and send an electrical signal to an application signally detection of the missing wavelength. If the electrical signal is generated due to the missing wavelength, the processor of the computing device 1204 can authorize the accessory 1200. In some embodiments, the processor of the computing device 1204 can execute more actions (e.g., unlocking one or more features of an application) if the accessory 1200 is authorized.

In some embodiments, a filter 1250 can be affixed to the housing 1202 to cover the rear flash unit 1226 of the computing device 1204. In some embodiments, the filter 1250 can filter various wavelengths of visible light generated from the rear flash unit 1226. In some embodiments the image processor of the camera 1224 can detect the absence of various wavelengths of visible light from the rear flash unit 1226.

Figure 13:
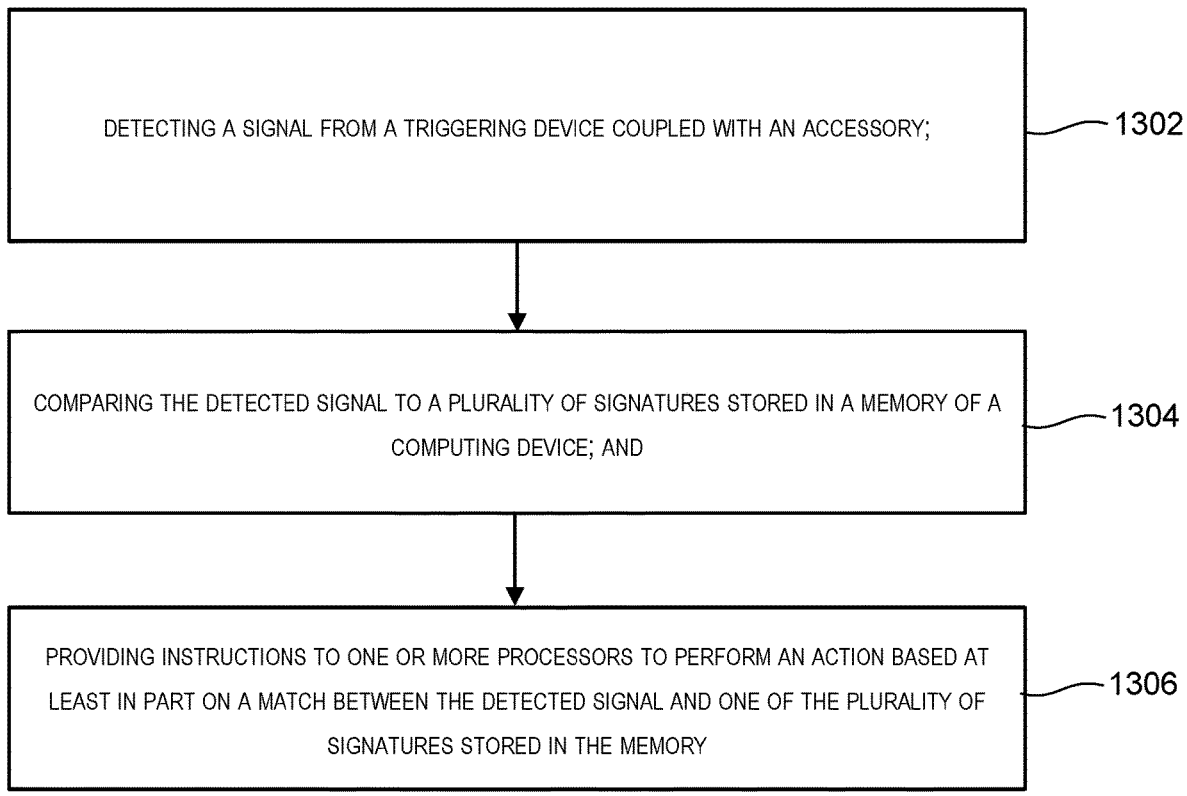
FIG. 13 illustrates a flow diagram for executing a mobile experience.

FIG. 13 illustrates an exemplary flow diagram for executing a mobile experience. At 1302, the technique includes detecting a signal from a triggering device coupled with an accessory. In some embodiments, the signal can be a radio frequency signal from a near field communication tag attached to the accessory. In some embodiments, the NFC tag can be embedded in the housing of the accessory. Alternatively, the NFC tag can be affixed to a surface of the housing. In some embodiments, an application runs in the foreground of the operating system of the computing device so the application detects the radio frequency when the NFC tag is within range. In some embodiments, an application needs to be executed on the computing device to command the NFC reader to search for the signal from the NFC tag.

In some embodiments, the signal can include a sound generated from an acoustic resonator or a whistle. The acoustic resonator can generate a sound at a distinct frequency. Similar to detecting a radio frequency signal, in some embodiments an application can run in the foreground and detect the sound following the sounds generation. In alternate embodiments, the application will need to be executed to send commands to the microphone to listen for the sound. In some embodiments, the acoustic generator can generate sound by inserting the computing device into the housing.

In some embodiments, the signal can include a magnetic signal generated from one or more magnets embedded or affixed to a housing of the accessory. A magnetometer in the computing device can detect the one or more magnets when inserting the computing device into the housing. The magnetometer can convert the detected changes in magnetic field to an electrical signal which can be analyzed by an application of the computing device.

In some embodiments, the signal can include an electrical signal generated by an image processor following capturing an image of a QR code or a bar code (e.g., a vertical bar code). In some embodiments, the image processor can detect a missing wavelength caused by a filter placed over the lens of the camera or the flash of a camera.

At 1304, the technique includes comparing the detected signal to a plurality of signatures stored in a memory of a computing device. In some embodiments, the computing device can store a plurality of signatures in a memory of the computing device. The computing device can also connect to a network (e.g., the internet) to access signatures on-line or download one or more signatures.

The processor can compare the detected signal to the plurality of signatures stored in a memory of the computing device. If the detected signal matches one of the plurality of signatures stored on-line or in a memory of the computing device, the application can acknowledge the match indicating an authorized accessory. In some instances, the processor can compare an alphanumeric code received from a NFC tag to a stored code. In some instances, the processor can compare a detected frequency of an audio signal with stored parameters (e.g., frequency) of a signature. In some instances, the processor can compare the code received from an image processor of a camera from QR codes or vertical bar codes with codes stored in memory. In some instances, the image processor of the camera can detect missing wavelengths due to one or more filters and generate an electrical signal. In some embodiments, a magnetometer can detect the change in the Earth's magnetic field due to one or more magnets embedded or affixed to a housing of the accessory.

At 1306, the technique includes providing instructions to providing instructions to one or more processors to perform an action based at least in part on a match between the detected signal and one of the plurality of signatures stored in the memory. Upon detecting a match between a detected signal and a stored signature the application can provide instructions to one or more processors to perform an action such an unlock one or more features of the application. The action can also include saving a token in the memory of the device indicating a match. The token can be used to unlock one or more features in an application on the computing device. The token can also be transmitted to a receiver of a second computing device to perform an action or unlock a feature. The action can also include one or more visual, haptic, or audio responses of the computing device.

It should be appreciated that the specific steps illustrated in FIG. 13 provide particular methods of unlocking a mobile experience according to various embodiments of the present disclosure. Other sequences of steps may also be performed according to alternative embodiments. For example, alternative embodiments of the present disclosure may perform the steps outlined above in a different order. Moreover, the individual steps illustrated in FIG. 13 may include multiple sub-steps that may be performed in various sequences as appropriate to the individual step. Furthermore, additional steps may be added or removed depending on the particular applications. One of ordinary skill in the art would recognize many variations, modifications, and alternatives.

Each of the methods described herein may be implemented using one or more computer systems. Each step of these methods may be executed automatically by one or the one or more computer systems, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 14:
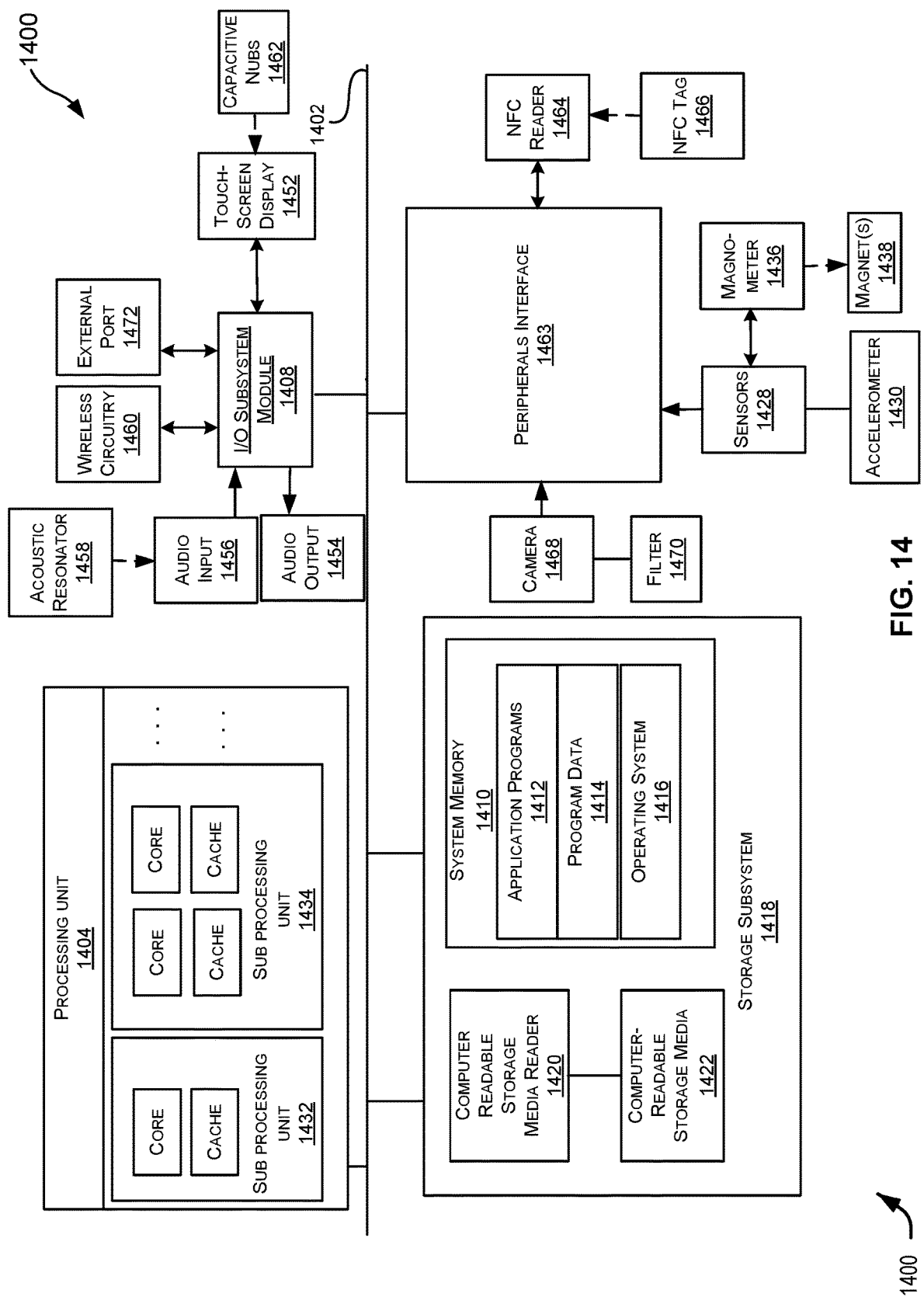
FIG. 14 illustrates a system for executing a mobile experience.

FIG. 14 illustrates a computer system 1400 for executing a mobile experience. Each of the embodiments disclosed herein may be implemented using a special-purpose computer system 1400. FIG. 14 illustrates a computer system 1400, in which various embodiments described herein may be implemented. The computer system 1400 may be used to implement any of the computer systems described above. As shown in the figure, computer system 1400 can include a processing unit 1404 that communicates with a number of peripheral subsystems via a bus subsystem 1402. These peripheral subsystems may include a peripherals interface 1463, an input/output (I/O) subsystem 1408, and a storage subsystem 1418. Storage subsystem 1418 can includes tangible computer-readable storage media 1422 and a system memory 1410.

Bus subsystem 1402 provides a mechanism for letting the various components and subsystems of computer system 1400 communicate with each other as intended. Although bus subsystem 1402 is shown schematically as a single bus, alternative embodiments of the bus subsystem may utilize multiple buses. Bus subsystem 1402 may be any of several types of bus structures including a memory bus or memory controller, a peripheral bus, and a local bus using any of a variety of bus architectures.

Processing unit 1404, which can be implemented as one or more integrated circuits (e.g., a conventional microprocessor or microcontroller), controls the operation of computer system 1400. One or more processors may be included in processing unit 1404. These processors may include single core or multicore processors. In certain embodiments, processing unit 1404 may be implemented as one or more independent processing units 1432 and/or sub processing unit 1434 with single or multicore processors included in each processing unit. In other embodiments, processing unit 1404 may also be implemented as a quad-core processing unit formed by integrating two dual-core processors into a single chip.

In various embodiments, processing unit 1404 can execute a variety of programs in response to program code and can maintain multiple concurrently executing programs or processes. At any given time, some or all of the program code to be executed can be resident in processor(s) 1404 and/or in storage subsystem 1418. Through suitable programming, processor(s) 1404 can provide various functionalities described above. Computer system 1400 may additionally include a processing acceleration unit, which can include a digital signal processor (DSP), a special-purpose processor, and/or the like.

Input/Output (I/O) subsystem 1408 may include user interface input devices and user interface output devices. User interface input devices may include a keyboard, pointing devices such as a mouse or trackball, a touchpad or touch screen display 1452 incorporated into a display, a scroll wheel, a click wheel, a dial, a button, a switch, a keypad, audio input devices with voice command recognition systems, microphones, and other types of input devices. The touch screen display 1452 can receive inputs from one or more capacitance nubs 1462 making contact with the touch screen display 1452. The capacitance nubs can be embedded in the housing 602 (as shown in FIG. 6 and FIG. 7).

In some embodiments, the displays 1452 can be formed from a liquid crystal display (LCD) panels, light emitting diodes (LED), thin-film transistor liquid-crystal display (TFT LCD), or LPD (light emitting polymer display) technology, although other display technologies can be used in other embodiments.

The computer system 1400 can include one or audio output devices 1454. The audio output devices 1454 can include one or more loudspeakers, or headphones. The audio output devices 1454 can receive audio signals through the I/O subsystem 1408. The computer system 1400 can include one or more audio input devices 1456. The one or more audio input devices 1456 can include one or more microphones. The one or more microphones can receive audio inputs to include a range of frequencies. The one or more microphones can be positioned to receive sound produced from an acoustic resonator 1458 (as shown as acoustic resonator 840 in FIG. 8 or acoustic resonator 940 in FIG. 9) or whistle 1044 (as shown in FIG. 10.)

Wireless circuitry 1460 is used to send and receive information over a wireless link or network to one or more other devices' conventional circuitry such as an antenna system, a radio-frequency (RF) transceiver, one or more amplifiers, a tuner, one or more oscillators, a digital signal processor, a CODEC chipset, memory, etc. Wireless circuitry 1460 can use various protocols, e.g., as described herein. For example, wireless circuitry 1460 can have one component for one wireless protocol (e.g., Bluetooth®) and a separate component for another wireless protocol (e.g., ultra-wideband (UWB)). Different antennas can be used for the different protocols.

Wireless circuitry 1460 is coupled to processing system 1404 via I/O subsystem 1408. Peripherals interface 1463 can include conventional components for establishing and maintaining communication between peripherals and processing system 1404. Voice and data information received by wireless circuitry 1460 (e.g., in speech recognition or voice command applications) is sent to one or more processors 1404 via I/O subsystem 1408.

The I/O subsystem module 1408 facilitates communication with other devices over one or more external ports 1472 or via wireless circuitry 1460 and includes various software components for handling data received from wireless circuitry 1460 and/or external port 1472. External port 1472 (e.g., universal serial bus (USB), micro universal serial bus, FireWire, Lightning connector, 60-pin connector, etc.) is adapted for coupling directly to other devices or indirectly over a network (e.g., the Internet, wireless LAN, etc.).

Peripherals interface couple the input and output peripherals of the device to processing unit 1404 and storage subsystem 1418. The peripherals can include a Near Field Communication (NFC) reader 1464 to read one or more NFC tags 1466. The NFC tag 1466 can be embedded in a housing 302 (as shown in FIG. 3). The peripherals can include one or more cameras 1468. In some embodiments, the peripherals can include a camera 1468. In some embodiments, the camera 1468 can include one or more lens, an image processing circuitry, and one or more flash units. In some embodiments, a filter 1470 can be coupled with or affixed to a housing 1202 (as shown in FIG. 12) of an accessory 1200. The filter 1470 can be a notch filter to filter out one or more discreet wavelengths of light. In some embodiments, peripherals can include sensors 1428. Sensors 1428 can include accelerometers 1430, compasses, gyrometers, pressure sensors, audio sensors, light sensors, barometers, and the like. Sensors 1428 can include a magnetometer 1436 that can detect local changes in the Earth's magnetic field. The magnetometer 1436 can also detect one or more magnets 1438 that can be embedded or affixed to a housing 1102 (as shown in FIG. 11).

Computer system 1400 may comprise a storage subsystem 1418 that comprises software elements, shown as being currently located within a system memory 1410. System memory 1410 may store program instructions that are loadable and executable on processing unit 1404, as well as data generated during the execution of these programs.

Depending on the configuration and type of computer system 1400, system memory 1410 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1404. In some implementations, system memory 1410 may include multiple different types of memory, such as static random access memory (SRAM) or dynamic random access memory (DRAM). In some implementations, a basic input/output system (BIOS), containing the basic routines that help to transfer information between elements within computer system 1400, such as during start-up, may typically be stored in the ROM. By way of example, and not limitation, system memory 1410 also illustrates application programs 1412, which may include client applications, Web browsers, mid-tier applications, relational database management systems (RDBMS), etc., program data 1414, and an operating system 1416. By way of example, operating system 1416 may include various versions of Microsoft Windows®, Apple Macintosh®, and/or Linux operating systems, a variety of commercially-available UNIX® or UNIX-like operating systems (including without limitation the variety of GNU/Linux operating systems.

Storage subsystem 1418 may also provide a tangible computer-readable storage medium for storing the basic programming and data constructs that provide the functionality of some embodiments. Software (programs, code modules, instructions) that when executed by a processor provide the functionality described above may be stored in storage subsystem 1418. These software modules or instructions may be executed by processing unit 1404. Storage subsystem 1418 may also provide a repository for storing data used in accordance with the present disclosure.

Storage subsystem 1418 may also include a computer-readable storage media reader 1420 that can further be connected to computer-readable storage media 1422. Together and, optionally, in combination with system memory 1410, computer-readable storage media 1422 may comprehensively represent remote, local, fixed, and/or removable storage devices plus storage media for temporarily and/or more permanently containing, storing, transmitting, and retrieving computer-readable information.

Computer-readable storage media 1422 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable read only memory (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1400.

By way of example, computer-readable storage media 1422 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1422 may include, but is not limited to, Zip® drives, flash memory cards, universal serial bus (USB) flash drives, secure digital (SD) cards, DVD disks, digital video tape, and the like. Computer-readable storage media 1422 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magneto resistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1400.

I/O subsystem module 1408 provides an interface to other computer systems and networks. The I/O subsystem module 1408 serves as an interface for receiving data from and transmitting data to other systems from computer system 1400. For example, the I/O subsystem module 1408 may enable computer system 1400 to connect to one or more devices via the Internet. In some embodiments, the I/O subsystem module 1408 can include radio frequency (RF) transceiver components for accessing wireless voice and/or data networks (e.g., using cellular telephone technology, advanced data network technology, such as 3G, 4G or EDGE (enhanced data rates for global evolution), 5G, WiFi (IEEE 802.11 family standards, or other mobile communication technologies, or any combination thereof), global positioning system (GPS) receiver components, and/or other components. In some embodiments, the I/O subsystem module 1408 can provide wired network connectivity (e.g., Ethernet) in addition to or instead of a wireless interface.

Computer system 1400 can be one of various types, including a handheld portable device (e.g., an iPhone® smartphone, an iPad® computing tablet, a PDA, Android smartphone), a wearable device (e.g., a Google Glass® head mounted display, iWatch), a PC, a workstation, a mainframe, a kiosk, a server rack, or any other data processing system.

Due to the ever-changing nature of computers and networks, the description of computer system 1400 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present disclosure. It will be apparent, however, to one skilled in the art that embodiments of the present disclosure may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the disclosure as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods may have been described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An accessory for interacting with a computing device, comprising:
   an attachment point for coupling the accessory to the computing device; and
   a triggering device coupled with the accessory, wherein the triggering device generate a signal to cause an action in the computing device, wherein the triggering device comprises an a visual identification code imprint affixed to the accessory such that a camera of the computing device detects the visual identification code during coupling, thereby triggering the action in the computing device.

2. The accessory of claim 1, further comprising a second triggering device comprises a near field communication chip embedded in the accessory, wherein the near field communication chip transmits one or more wireless signals to the computing device to trigger the action in the computing device.

3. The accessory of claim 1, further comprising a second triggering device comprises a magnet coupled to the accessory, wherein the magnet causes a change in a local magnetic field, the change in the local magnetic field being detected by a magnetometer of the computing device and triggering the action in the computing device.

4. The accessory of claim 1, wherein the visual identification code comprises a Quick Response (QR) code.

5. The accessory of claim 1, wherein the visual identification code comprises a bar code.

6. An accessory for interacting with a computing device, comprising:
   an attachment point for coupling the accessory to the computing device; and
   a triggering device coupled with the accessory, wherein the triggering device generate a signal to cause an action in the computing device, wherein the triggering device comprises a plurality of capacitive tip nubs affixed to an inside portion of the accessory such that the capacitive tip nubs touches at least a portion of a touch screen display of the computing device thereby triggering the action in the computing device.

7. An accessory for interacting with a computing device, comprising:
   an attachment point for coupling the accessory to the computing device; and
   a triggering device coupled with the accessory, wherein the triggering device generate a signal to cause an action in the computing device, wherein the triggering device comprises an acoustic resonator affixed to the accessory such that the acoustic resonator emits a target frequency, the target frequency being received by a microphone of the computing device thereby triggering the action in the computing device.

8. An accessory for interacting with a computing device, comprising:
   an attachment point for coupling the accessory to the computing device; and
   a triggering device coupled with the accessory, wherein the triggering device generate a signal to cause an action in the computing device, wherein the triggering device comprises a notch filter affixed to the accessory, the notch filter being configured to overlay a camera of the computing device, the notch filter causing a frequency range to be blocked by the notch filter, whereby an application running on the computing device detects an absence of the frequency range blocked by the notch filter thereby triggering the action in the computing device.

9. A computer-implemented method performed by one or more processors, comprising:
   detecting a signal from a triggering device coupled with an accessory;
   comparing the detected signal to a plurality of signatures stored in a memory of a computing device, wherein the signal comprises an acoustic signal generated by an acoustic resonator affixed to the accessory such that the acoustic resonator emits a target frequency received by a microphone of the computing device; and
   providing instructions to one or more processor to perform an action based at least in part on a match between the detected signal and one of the plurality of signatures stored in the memory.

10. A computer-implemented method performed by one or more processors, comprising:
    detecting a signal from a triggering device coupled with an accessory;
    comparing the detected signal to a plurality of signatures stored in a memory of a computing device, wherein the signal comprises detection of a visual identification code affixed to an inside of the accessory such that a camera of the computing device detects the visual identification code during coupling of the computing device and the accessory.

11. The accessory of claim 10, wherein the visual identification code comprises a Quick Response (QR) code.

12. The accessory of claim 10, wherein the visual identification code comprises a bar code.

13. A computer-implemented method performed by one or more processors, comprising:
    detecting a signal from a triggering device coupled with an accessory;
    comparing the detected signal to a plurality of signatures stored in a memory of a computing device, wherein the signal comprises an electrical signal generated by a touch screen display by a plurality of capacitive tip nubs affixed to an inside portion of the accessory such that the capacitive tip nubs touches at least a portion of a touch screen display of the computing device.

14. A computer-implemented method performed by one or more processors, comprising:
    detecting a signal from a triggering device coupled with an accessory;
    comparing the detected signal to a plurality of signatures stored in a memory of a computing device, wherein the signal comprises an electronic signal from a digital camera of the computing device, wherein an image processor of the digital camera detects a frequency range blocked by a notch filter installed over a lens of the digital camera.

15. A non-transitory, computer-readable medium comprising instructions that, when executed by one or more processors, cause the one or more processors to perform operations comprising:
   detecting a signal from a triggering device coupled with an accessory, wherein the signal comprises an acoustic signal generated by an acoustic resonator affixed to the accessory such that the acoustic resonator emits a target frequency received by a microphone of a computing device;
   comparing the detected signal to a plurality of signatures stored in a memory of a computing device; and
   providing instructions to one or more processors to perform an action based at least in part on a match between the detected signal and one of the plurality of signatures stored in the memory.

16. A non-transitory, computer-readable medium comprising instructions that, when executed by one or more processors, cause the one or more processors to perform operations comprising:
   detecting a signal from a triggering device coupled with an accessory, computer-readable medium of claim 15, wherein the signal comprises detection of a visual identification code imprint affixed to the accessory such that a camera of the computing device detects the visual identification code during coupling of the computing device and the accessory.

17. The non-transitory, computer-readable medium of claim 16, wherein the visual identification code comprises a Quick Response (QR) code.

18. The non-transitory, computer-readable medium of claim 16, wherein the visual identification code comprises a bar code.

19. A non-transitory, computer-readable medium comprising instructions that, when executed by one or more processors, cause the one or more processors to perform operations comprising:
   detecting a signal from a triggering device coupled with an accessory, computer-readable medium of claim 15, wherein the signal comprises an electrical signal generated by a touch screen display by a plurality of capacitive tip nubs affixed to an inside portion of the accessory such that the capacitive tip nubs touches at least a portion of a touch screen display of the computing device.

* * * * *